March 18, 1969     P. J. REISH     3,432,935
INTERNAL THREAD GAUGE
Filed July 25, 1966
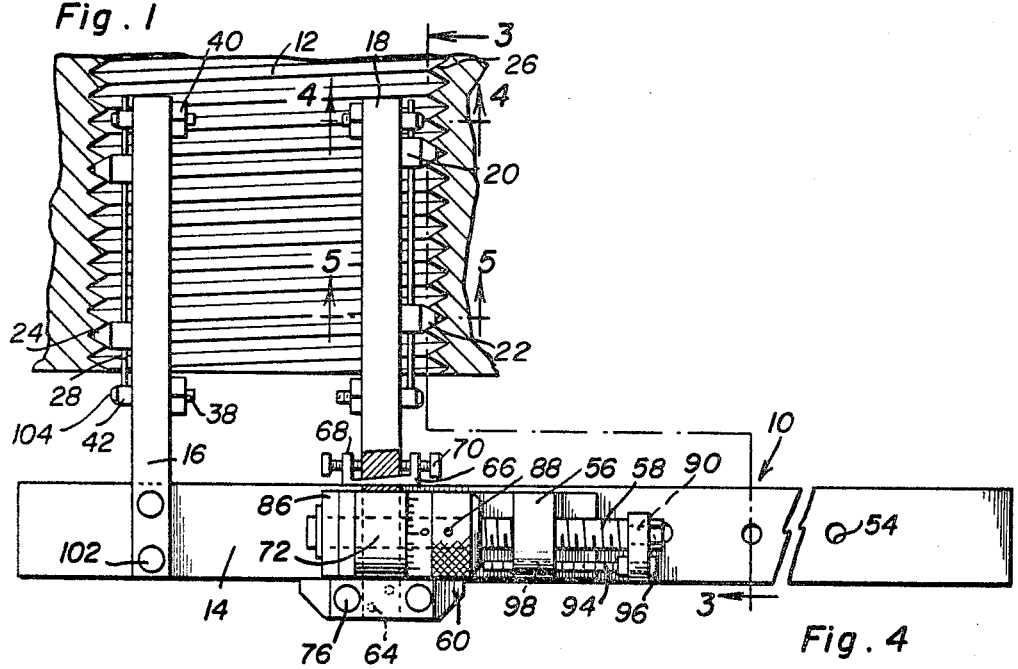
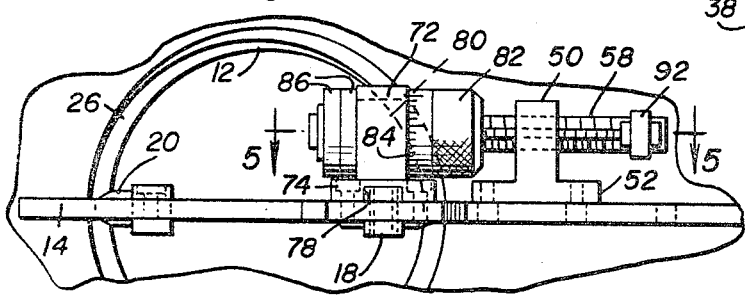
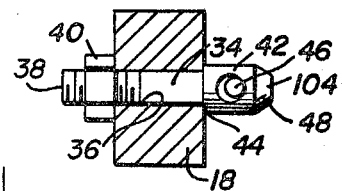
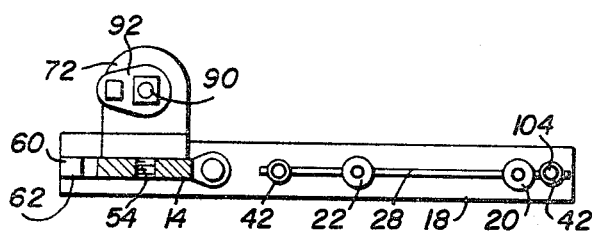
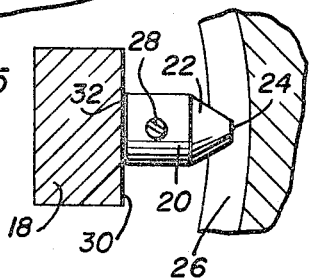
Percy J. Reish
INVENTOR.
BY *Clarence A. O'Brien*
*and Harvey B. Jacobson*
Attorneys

United States Patent Office 3,432,935
Patented Mar. 18, 1969

3,432,935
INTERNAL THREAD GAUGE
Percy J. Reish, 1807 Fox St., West Hyattsville,
Md. 20782
Filed July 25, 1966, Ser. No. 567,714
U.S. Cl. 33—199      8 Claims
Int. Cl. G01b *3/48*

ABSTRACT OF THE DISCLOSURE

A thread gauge in the form of an elongated beam having a pair of spaced parallel legs thereon with one of the legs being movable along the beam. Each leg has a wire-like rod on which thread engaging members are movably mounted and means is provided for measuring the movement of the movable leg and to retain the movable leg in accurate perpendicular relation to the beam for providing an accurate device for measuring thread diameter.

---

The present invention generally relates to a measuring gauge and more particularly to a gauge for measuring internal thread diameter.

An object of the present invention is to provide an internal thread diameter measuring gauge having an elongated beam with a pair of legs extending perpendicular therefrom in parallel relation with the legs having outwardly facing measuring surfaces thereon and at least one of the legs being longitudinally slidable in relation to the beam with a micrometer head being operatively connected to the slidable leg to gauge the position thereof.

Another object of the present invention is to provide an internal thread diameter measuring gauge in which each of the legs is provided with movable gauging elements in the form of pointed conical members having a specific included angle at the apex thereof such as sixty degrees with the bases of the conical members and the legs having precise engaging surfaces with the mounting for the conical members or points being such that they can move freely longitudinally of the leg and then engage the surface of the leg during the measuring of the internal thread diameter.

A further important object of the present invention is to provide an internal thread diameter measuring gauge in which the elongated beam and micrometer assembly include cooperating means for adjusting the position of the sliding leg to facilitate variation in the range of measurements which can be expeditiously measured with the invention with the structural details of the sliding leg and the connection with the beam and the micrometer saddle being such as to eliminate any possible looseness or imprecision.

Still a further object of the invention is to provide a gauge in accordance with the preceding objects which is simple in construction, easy to use, effective for accurate reading of internal thread diameters and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the internal thread diameter measuring gauge of the present invention illustrating the device in use and with portions of the device broken away for clarity;

FIGURE 2 is a side elevational view illustrating the relationship of the structural components of the invention;

FIGURE 3 is a sectional view taken along section line 3—3 of FIGURE 1 illustrating the construction of the sliding leg and the manner of mounting the conical points thereon;

FIGURE 4 is a detailed sectional view taken substantially upon a plane passing along section line 4—4 of FIGURE 1 illustrating the mounting structure for the supporting rod for the conical points; and FIGURE 5 is a detailed sectional view taken substantially upon a plane passing along section line 5—5 of FIGURE 1 illustrating further structural details of the conical points and their association with the supporting rod and leg with which they engage.

Referring now specifically to the drawings, the numeral 10 generally designates the internal thread diameter measuring gauge of the present invention which is used to measure the thread diameter of internal threads designated by numeral 12 for determining the internal threaded diameter thereof.

The gauge 10 includes an elongated beam 14 of generally rectangular cross-sectional configuration and which may conveniently be in the form of bar stock, tool steel or the like. Extending to one side of the beam 14 in perpendicular relation to the beam 14 and in parallel relation to each other is a pair of legs 16 and 18 with the leg 16 being considered a stationary leg and the leg 18 being movable longitudinally of the beam 14 in a manner described hereinafter. The legs 16 and 18 are adapted to extend into the internal threaded bore 12 for measuring the internal thread diameter.

Each leg 16 and 18 has a pair of thread engaging elements 20 having a conical point 22 thereon which has an included angle of 60° and has the tip or apex end thereof flattened as at 24 for engagement with the threads 26 in a manner described hereinafter. Each of the thread engaging members or points 20 is mounted on an elongated rod 28 for longitudinal adjustable movement in relation to the leg 18 and in normal position, the pointed member 20 is slightly spaced from a precision surface 30 on the leg 18 as illustrated in FIGURE 5 and designated by numeral 32. However, the mounting rod 28 is such that pressure exerted on the pointed member 20 will cause the base of the pointed member 20 to engage the surface 30 of the leg 18.

The ends of the supporting rod 28 extend into a threaded mounting rod 34 each of which extends through a bore 36 in the leg 18 as illustrated in FIGURE 4 and each of which has a threaded end portion 38 receiving a retaining nut 40 thereon. The other end of the retaining member 34 is provided with an enlarged end 42 defining a shoulder 44 for abutment with the leg 18 for positively securing the mounting rod 34 to the leg 18. The supporting rod 28 extends through an aperture 46 in the enlarged head end 42 of the mounting rod 34 and the outer end of the enlarged head 42 may be tapered and flattened as at 48 to avoid contact with the threads 26. This construction enables longitudinal adjustment of the pointed members 20 in relation to the length of the movable leg 18 as well as in relation to the stationary legs 16 and the mounting rod structure 34 enables the thread engaging members 20 to be removed for replacement when required either due to wear, imprecision or when it is desired to change to thread engaging members having different characteristics of configuration.

Mounted on the beam 14 is a bracket 50 having a base 52 attached to a pair of holes 54 which receives suitable screw-threaded fasteners or the like with the bracket 56 screwthreadedly receiving the threaded tail stock 58 to enable adjustable positioning thereof.

The slidable leg 18 includes a T-head 60 engaging the edge of the beam 14 on the opposite side thereof from which the leg 18 projects and the leg 18 is slotted as at 62 to receive the beam 14 and the T-head 60 as illustrated in FIGURE 3 with suitable pins 64 being employed for attachment of the leg 18 to the T-head 60. This provides a precise surface engagement with the inner surface of the T-head 60 sliding against the edge of the beam 14 and the leg 18 perpendicular to this surface. For locking the sliding leg 18 in position and at least retaining the surface of the T-head 60 against the surface of the beam 14, a sliding wedge 66 is provided between the inner surface of the beam 14 and the inner edge of the slot 62. Each end of the wedge 66 is provided with a lateral projection 68 receiving a thumb screw or finger screw 70 which has the inner ends thereof abutting opposed surfaces of the leg 18 so that by tightening one screw 70 and loosening the other, the wedge 66 may be moved. Longitudinal movement of the wedge 66 will tighten or loosen the leg 18 in relation to the beam 14 and will enable locking engagement thereof or at least precise sliding engagement of the leg 18 with the beam 14.

Mounted on the leg 18 is a micrometer head stock bracket 72 which has a base plate 74 which projects laterally into overlying relation to a portion of the T-head 60 and is secured thereto as by fasteners 76. Also, the base plate 74 is slotted as at 78 to bridge the upper portion of the leg 18 so that the lower surface of the base plate will rest on the beam 14 as illustrated in FIGURE 3.

The head stock bracket is tubular to receive an extension 80 on the knurled head 82 which is graduated at 84 into increments of 0.05 inch. The extension 80 is provided with a pair of adjustable lock nuts 86 thereon to secure the head to the micrometer head stock bracket and the head is mounted on the micrometer screw and is fastened thereto as by a setscrew 88 or the like. The outer end of the micrometer screw is provided with a reduced cylindrical end portion 90 having a laterally extending bracket 92 rotatively mounted thereon. A graduated rod 94 is attached to the bracket 92 in spaced parallel relation to the micrometer screw 58 and is secured in place thereon by retaining nuts 96. The graduated rod 94 slides through an aperture 98 in the tail stock bracket 56 through which the micrometer screw 58 is threaded so that the distance of movement of the sliding leg 18 will be indicated by the graduated rod 94 and this will also indicate the revolutions of the micrometer head 82 and the micrometer screw 58.

The conical thread engaging elements 20 are loosely mounted on rod 28 by virtue of the apertures 46 being larger in diameter than the rod 28 and the apertures through the conical elements 20 may also be larger to enable the conical elements 20 to seek their own seat in the threads since they can move in any direction. Also, the use of four conical elements provides for the opposite conical elements seeking opposed parallel lines of engagement with the threads.

The micrometer screw may be of conventional construction, such as a 20-thread pitch and the indicating rod 94 may be 5/32 inch in diameter and graduated to 0.05 inch to indicate the movement of the screw and sliding leg travel. Also, the revolutions of the micrometer head which is of course locked to the micrometer screw are indicated by the graduations and index line on the head stock bracket. Various types of fastening structures may be employed such as steel pins or the like with the base plate 52 of the tail stock bracket 56 being secured in place by countersunk threaded fasteners to enable adjustment thereof to vary the range of measurement. Also, the leg 16 may be slotted and secured to the beam 14 by pin-type fasteners 102 or the like for rigidly and fixedly securing the leg thereto. The beam is rectangular in construction and may conveniently be one inch wide and 5/32 inch in thickness and is constructed with precision ground surfaces. The micrometer tail stock bracket 56 through which the 20 threads per inch micrometer screw extends may be provided with a conventional wear take-up shoe and the holes in the beam 14 may conveniently be located one inch apart. The legs 16 and 18 may be 3/8 inch by 7/16 inch and of any convenient length. The thread engaging elements are 0.3 inch in diameter with the length of the cylindrical portion being 0.140 inch, the included angle being 60°, the distance to the apex of the conical surface being 0.3998 inch and the distance to the flattened surface inwardly of the theoretical apex being 0.2598 inch.

The surfaces on the head 42 of the mounting rod 34 are the basic measuring surfaces and are designated for reference purposes by numeral 104 and these surfaces must, of course, be clear of the work area and the surfaces 104 will be exposed in relation to the threaded bore 12 at least 5/16 inch to enable an O.D. micrometer to be used for measure over the surface 104. The basic formula for U.S. standard threads to determine the measure across the surfaces 104 is as follows: minimum diameter $$-2(.86603 \times .3) + 2\left(\frac{.75775}{P}\right)$$

For example, if the diameter is 2.5 inches and the thread pitch is 6, the minimum diameter is $$2.5 \text{ inches} - \left(\frac{1.30}{6}\right)$$

or $2.5 - .2166 = 2.2834$. Using the above formula, the measurement across the surfaces 104 would be $$2.2834 - .5196 + .2525 = 2.0163$$

inches.

What is claimed as new is as follows:

1. A gauge for measuring thread diameter comprising an elongated beam, a pair of spaced parallel legs extending in perpendicular relation from one side of said beam, one of said legs being stationary and the other of said legs being movable, means interconnecting the movable leg and the beam for moving the movable leg longitudinally of the beam while maintaining perpendicular relation, means on each of said legs for engaging threads and for positioning the legs in a predetermined spaced apart relation depending upon the thread diameter, said means on each of said legs including at least a pair of thread engaging elements, and means supporting said thread engaging elements for shifting movement parallel to the legs, said means supporting said thread engaging elements normally supporting the elements in slightly spaced relation to their respective legs and enabling movement thereof into contact with their respective legs when pressure is exerted on the thread engaging elements to provide a precision surface for supporting the thread engaging elements.

2. The structure as defined in claim 1 wherein each of said thread engaging elements is in the form of a conical member having a precision base surface, each conical member having a tip provided with a requisite included angle for engagement with the threads.

3. The structure as defined in claim 2 wherein said means supporting the conical members being in the form of wire-like rods, said rods being mounted in parallel spaced relation to said legs and being resilient.

4. The structure as defined in claim 3 wherein said means securing the movable leg to the beam includes a longitudinal slot in the end of the movable leg bridging the beam, a T-head attached to the slotted end of the movable leg and providing a surface-to-surface engagement with the outer edge of the beam, and wedge means extending through the other end of the slot between the inner edge of the beam and the inner edge of the slot for locking the movable leg to the beam in perpendicular relation.

5. The structure as defined in claim 4 wherein said movable leg also includes a micrometer head stock bracket attached thereto, a micrometer head rotatable in the head stock bracket, a micrometer screw attached to the rotating micrometer head, a tail stock bracket secured to the beam and threadedly receiving the micrometer screw for enabling adjustment of the head stock bracket and movable leg upon rotation of the micrometer head, and means indicating the position of the micrometer head.

6. The structure as defined in claim 5 wherein said indicating means includes an indicating rod having a graduated scale thereon fixed to the end of the micrometer screw for longitudinal movement and nonrotative movement in response to axial movement of the micrometer screw and indicating the movement of the micrometer screw and the micrometer head by the graduations thereon.

7. The structure as defined in claim 6 together with gauging surfaces disposed in longitudinally spaced relation to the thread engaging means on the legs for orientation exteriorly of the threads being measured.

8. The structure as defined in claim 7 wherein said gauging surfaces are rigid with said legs, one end of each supporting rod for the conical members being disposed adjacent the beam and supported by support members rigid with the legs, said gauging surfaces being mounted on said support members.

References Cited

UNITED STATES PATENTS

| | | | |
|---|---|---|---|
| 2,027,217 | 1/1936 | Zerkle | 33—148 |
| 3,090,126 | 5/1963 | Kernoski | 33—149 |
| 2,290,045 | 7/1942 | Harley et al. | 33—199 |
| 3,113,384 | 12/1963 | Keszler | 33—143 |
| 1,891,783 | 12/1932 | Savage | 33—143 |
| 2,741,848 | 4/1956 | Livingston | 33—167 |
| 2,941,304 | 6/1960 | Man | 33—199 |

LEONARD FORMAN, *Primary Examiner.*

S. STEPHAN, *Assistant Examiner.*

U.S. Cl. X.R.

33—143, 167